US008740494B2

(12) United States Patent
Durling

(10) Patent No.: US 8,740,494 B2
(45) Date of Patent: Jun. 3, 2014

(54) CLAMPING ASSEMBLY

(75) Inventor: Christopher J. Durling, Bristol (GB)

(73) Assignee: Rolls-Royce PLC, London (GB)

( * ) Notice: Subject to any disclaimer, the term of this patent is extended or adjusted under 35 U.S.C. 154(b) by 26 days.

(21) Appl. No.: 13/566,403

(22) Filed: Aug. 3, 2012

(65) Prior Publication Data
US 2013/0045046 A1 Feb. 21, 2013

(30) Foreign Application Priority Data

Aug. 18, 2011 (GB) .................................. 1114188.4

(51) Int. Cl.
*F16D 1/076* (2006.01)
*F16B 7/04* (2006.01)
*F16B 2/18* (2006.01)

(52) U.S. Cl.
CPC .............. *F16B 7/0413* (2013.01); *F16B 2/185* (2013.01)
USPC ......................................... 403/374.4; 403/16

(58) Field of Classification Search
CPC ............ F16B 2/065; F16B 2/18; F16B 2/185; F16B 7/0406; F16C 25/06; F01D 25/243; F01D 25/24; F16D 1/06; F16D 1/0811; F16D 1/0817; F16D 1/108
USPC ....................... 403/1, 16, 19, 336, 373–374.4
See application file for complete search history.

(56) References Cited

U.S. PATENT DOCUMENTS

| 3,851,365 | A | * | 12/1974 | Oxlade | ............................. | 492/1 |
| 4,019,824 | A | * | 4/1977 | Percy | ............................. | 403/261 |
| 4,131,381 | A | | 12/1978 | Alberts | | |
| 4,373,832 | A | * | 2/1983 | Monteillet | ................. | 403/374.4 |
| 6,524,061 | B1 | * | 2/2003 | Hirokawa et al. | ............. | 415/114 |
| 7,431,349 | B2 | * | 10/2008 | Muller et al. | ................. | 285/339 |
| 7,704,029 | B2 | * | 4/2010 | Blais et al. | ..................... | 411/197 |
| 8,303,208 | B2 | * | 11/2012 | Tully, Jr. | .................... | 403/359.5 |
| 8,460,118 | B2 | * | 6/2013 | Anderson et al. | ............. | 464/182 |
| 2010/0329776 | A1 | * | 12/2010 | Durling | ......................... | 403/342 |
| 2012/0006037 | A1 | * | 1/2012 | Howells | .......................... | 60/796 |

FOREIGN PATENT DOCUMENTS

| FR | 507.602 | | 9/1920 | |
| FR | 2 900 694 A1 | | 11/2007 | |
| GB | 2467642 A | | 8/2010 | |
| WO | WO 2008/064818 A1 | | 6/2008 | |
| WO | WO 2008064818 A1 | * | 6/2008 | ............... H02K 7/08 |

OTHER PUBLICATIONS

Great Britain Search Report issued in British Application No. 1114188.4 dated Nov. 28, 2011.
Dec. 3, 2012 Search Report Issued in European Patent Application No. 12 17 9197.

* cited by examiner

*Primary Examiner* — Joshua Kennedy
(74) *Attorney, Agent, or Firm* — Oliff PLC

(57) ABSTRACT

A clamping assembly for clamping a first component in the form of a bearing race to a second component in the form of a shaft, which in use is clamped coaxially with the bearing race. The clamping assembly includes a first member in the form of a first ring having a retaining formation in the form of a thread for retaining the first ring to the shaft, a second member in the form of a segmented second ring, a third member in the form of a third segmented ring, a spacer ring and a locking ring. Each of the segments of the second ring and third ring are pivotable or rollable relative to one another.

18 Claims, 13 Drawing Sheets

Related Art

CLAMPING ASSEMBLY

This invention relates to a clamping assembly.

In particular it relates to a clamping assembly for clamping a first component to a second component, for instance in a gas turbine engine.

BACKGROUND

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

Gas turbine engines typically require numerous components to be clamped or bolted to other components. Such components could comprise bearings, stub shafts, discs or gears and these components may, for example, require retention onto a shaft or into a housing.

As shown in FIG. 2, a common method of retaining a component 8 to, for example, a shaft 4 or housing (not shown), is to use a threaded ring 2, which engages with a corresponding thread of the shaft 4. The threaded ring 2, component 8 and shaft 4 are each disposed about a centreline 6 of the shaft 4. In use, the ring 2 is threaded onto the shaft and rotated until the component 8 and ring 2 are in close contact with each other, and the ring 2 is then tightened onto the component 8 using tooling (not shown) which engages in slots formed between protrusions 11 which protrude from the ring 2. The component 8 is sandwiched between the threaded ring 2 and an abutment shoulder 13 in the shaft 4. The component is therefore secured to the shaft 4 by applying a clamp load in the direction A.

The clamp load generated by the threaded ring 2 between the shoulder 13 and the component 8 is determined by the amount of strain it introduces to the assembly comprising the shaft 4, the component 8 and the threaded ring 2. This in turn is determined by the amount the threaded ring is turned once all the components of the assembly are in close contact with each other.

The amount the threaded ring is turned is typically determined by applying a pre-calculated torque to the threaded ring 2. Another method used is angle-based tightening, in which the threaded ring 2 is turned through a predetermined angle once all the components of the assembly are in close contact with each other, regardless of the torque applied.

Where high clamp loads are required, high torques must be applied to the ring 2. During tightening however, friction occurs between the ring 2 and the shaft 4, and particularly between the threads of the ring 2 and shaft 4, and also between the ring 2 and the component 8. As a result, the torque that must be applied to the tool to turn the ring to the required extent is generally greatly in excess of the final torque that must be applied by the clamp ring in order to achieve the required clamp load. The torque that must be applied by the tool can be more than 10 and perhaps as much as 100 times as much the required final torque in the case of shafts having a diameter greater than 0.25 inches.

Such high torques can be difficult to apply. The high torques can also result in damage to one or both of the components, such as galling. Furthermore, variation in the coefficient of friction of the surfaces can result in large variations in the final torque for a given applied torque.

The present invention therefore seeks to address these issues.

STATEMENTS OF INVENTION

According to a first aspect of the present invention there is provided a clamping assembly for clamping a first component to a second component, the clamping assembly comprising:

a first member spaced from the first component in use along a first axis by a second and a third member, and a retaining formation for retaining the first member in a predetermined position relative to the second component;

wherein at least one of the first member, second member, third member and the first component is shaped such that when the second and third members are in a first relative position, the overall length of the clamping assembly along the first axis is such that the third member is forced against the first component to thereby clamp the first and second components together; and wherein one of the second and third members defines a long axis and a short axis each extending between first and second contact surfaces of the respective second or third member, and is arranged such that the long axis intersects with the second contact surface of the other of the second and third member when in the first relative position, and the long axis is tangential to the second contact surface of the other of the second and third member when in a second relative position.

The second and third members may be arranged to roll or pivot relative to one another.

The assembly therefore provides a means of clamping first and second components together which experiences relatively low frictional forces when the assembly is moved between clamped and released positions, as the first and second components are clamped together by a pivoting or rolling movement of the second and third members. Furthermore, the clamping force is not dependent on coefficients of friction between the components, and so a more consistent clamping force can be achieved.

At least one of the first member, second member, third member and the first component may be shaped such that when the second and third members are in a second relative position, the overall length of the clamping assembly along the first axis is less than in the first relative position such that the third member is released from the first component.

The second and third members may be moveable beyond the first position in a direction away from the second position to a third relative position, in which the overall length of the clamping assembly is less than in the first relative position, but greater than in the second relative position, to thereby clamp the first and second components together to a lesser extent than in the first relative position. The second and third members may be moveable between the first and third positions.

At least one of the first, second and third members may be shaped such that when the second and third members are located between the first relative and third relative positions, the second and third members are biased toward the third relative position.

The first member may comprise a channel configured to locate at least part of the second and third members.

An edge part of at least one of the second and third members may engage with an engagement surface of the channel when the second and third members are in the third relative position to retain the second and third members in the third relative position.

Such an arrangement provides over-centre locking, such that the axial load between the first and second components caused by the clamping assembly locks the clamping assembly in the third relative position beyond the first relative position.

The second member may include a first contact surface, which may in use engage with a contact surface of the first member.

The third member may include a first contact surface, which may in use engage with a contact surface of the first component.

The second member may include a second contact surface, which may in use engage with a second contact surface of the third member.

One or both of the first and second contact surfaces of the second and third members may comprise an inwardly or outwardly curved surface.

One of the second or third members may comprise a generally elliptical profile.

The contact surface of either or both of the first member and the first component may comprise a generally arcuate curved surface, which may be generally curved inwardly.

In a first embodiment, the first contact surface of the second member may comprise a generally convex surface, and the second contact surface of the second member may comprise a generally concave surface. In the first embodiment, the first and second contact surfaces of the third member may comprise a generally convex surface.

In the first embodiment, the radius of curvature of the contact surface of the first member may be substantially equal to or greater than the radius of curvature of the first contact surface of the second member, the radius of curvature of the second contact surface of the second member may be substantially equal to or greater than the radius of curvature of the second contact surface of the third member, and the radius of curvature of the contact surface of the first component may be substantially equal to or greater than the radius of curvature of the first contact surface of the third member.

By providing contact surfaces having different radii of curvature, the second and third members are able to roll relative to one another between the first, second and third relative positions without sliding, thereby reducing friction between the components of the assembly in use.

In a second embodiment, both of the first and second contact surfaces of the second member may comprise a generally convex profile. In the second embodiment, the first contact surface of the third member may comprise a generally concave surface, and the second contact surface of the third member may comprise a generally convex surface.

In the second embodiment, the radius of curvature of the contact surface of the first member may be substantially equal to or greater than the radius of curvature of the first contact surface of the second member, the radius of curvature of the second contact surface of the second member may be substantially equal to or less than the radius of curvature of the second contact surface of the third member, and the radius of curvature of the contact surface of the first component may be substantially equal to or greater than the radius of curvature of the first contact surface of the third member.

In a third embodiment, the second contact surfaces of the second and third members may each be defined by teeth, which teeth may engage with the teeth of the other respective second contact surface. The teeth may define a respective pitch surface of each of the second and third members, which pitch surface may be generally convex.

In the third embodiment, the radius of curvature of the contact surface of the first member may be substantially equal to or greater than the radius of curvature of the first contact surface of the second member and the radius of curvature of the contact surface of the first component may be substantially equal to or greater than the radius of curvature of the first contact surface of the third member.

In a fourth embodiment, the assembly may include a fourth member, disposed in use between the second and third members. In the fourth embodiment, the first and second contact surfaces of each of the second and third members may be generally convex. The fourth member may define a pair of generally concave contact surfaces, which may engage in use with a respective second contact surface of the second and third member. The radius of curvature of the contact surfaces of the fourth member may be greater than the radius of curvature of the second contact surfaces of the second and third members. The fourth member may comprise a radially segmented ring.

The second member may comprise a first lever for moving the assembly from the first relative position to at least the second relative position, and possibly to the third relative position. The first lever may extend from a surface of the second member.

The third member may comprise a second lever for moving the assembly from at least the first relative position and possibly from the third relative position to the second relative position. The second lever may extend from an outer surface of the third member.

The first component may include a spacer member, which spacer member may define the contact surface of the first component.

One or more of the first, second, third and fourth members may comprise a ring. A respective second or third member may comprise a flexible ring, or may comprise a radially segmented ring.

Where a respective ring is radially segmented, the segments of the respective ring may be rotatable relative to each other about a circumference of the ring.

The second component may comprise a shaft, and the first component, and first, second and third members may be coaxial with the shaft.

The retaining arrangement may comprise a thread defined by opposing surfaces of the first member and second component.

The assembly may further comprise a locking arrangement configured to engage against an end surface of the first member when the assembly is in either the first or third relative position to lock the second and third members in the third relative position.

The assembly may include a tool for engaging with at least one of the first and second levers to move a respective second or third member between the first, second or third relative positions.

The tool may engage with a second thread formation defined by the first member.

The tool and the second thread formation may be arranged such that relative rotation between the tool and the first member axially translates an end of the tool by the second thread formation, to engage with one of the first and second levers.

The assembly may include first and second tools for engaging with a respective first and second lever.

Alternatively, a single tool may be provided having first and second relative positions for engagement with a respective first and second lever.

According to a second aspect of the present invention, there is provided a gas turbine engine having first and second components clamped by a clamping assembly in accordance with the first aspect of the invention.

According to a third aspect of the present invention, there is provided a method of calibrating a clamping assembly according to the first aspect of the present invention such that, when installed with the second and third members in a third position, the assembly imparts a predetermined clamping force to the clamped components, the method comprising the steps of:

retaining the first member in a predetermined position relative to a fixture;

assembling the second and third members in the third relative position;

applying a predetermined axial load to the third member; and removing a predetermined thickness of material from a proximal to the first component in use face of the first member.

The present invention will be more fully described by way of example with reference to the accompanying drawings, in which.

Figure 1:
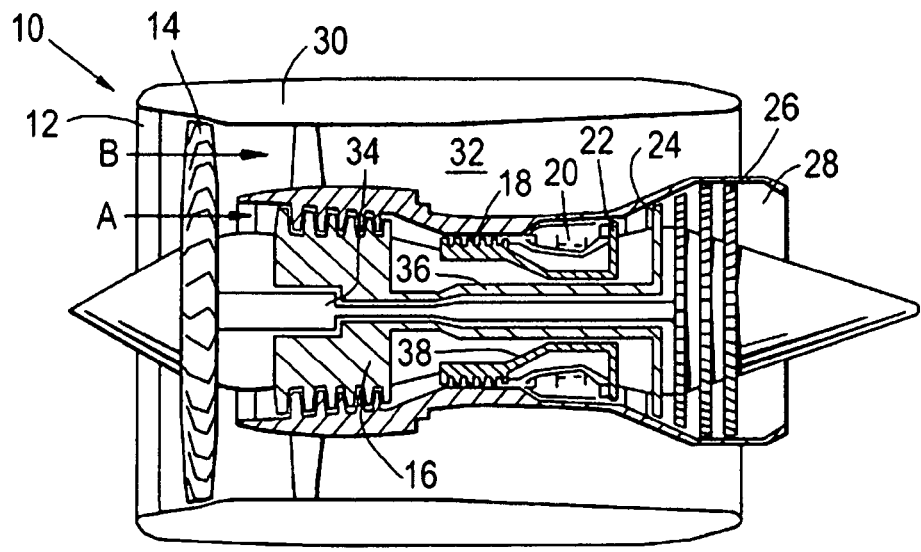
FIG. 1 is a sectional side view of a gas turbine engine.
Figure 2:
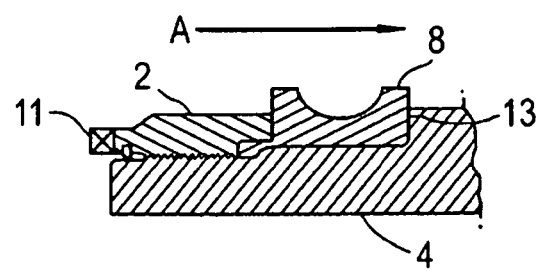
FIG. 2 is a sectional side view of a prior clamping assembly.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

The engine includes a shaft 34 which drives the fan 14 and is driven by the low pressure turbine 26. The engine further includes shafts 26 and 38 for connecting the intermediate pressure and low pressure compressors to the intermediate and low pressure turbines respectively. Each shaft 34, 36, 38 is rotatably connected to a shaft housing (not shown) by a bearing arrangement, which includes a bearing race 50.

Figure 3:
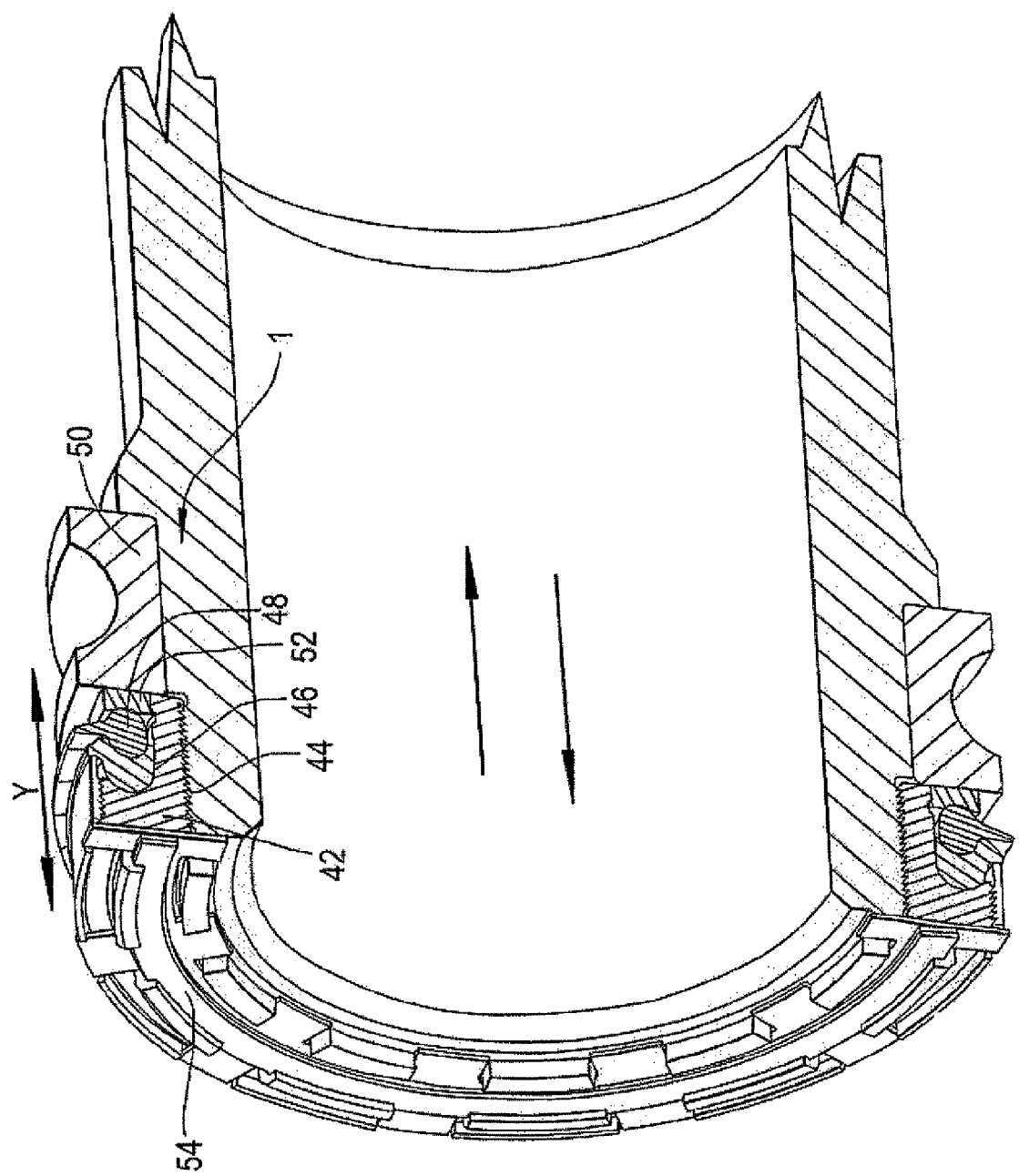
FIG. 3 is a sectional perspective view through part of a clamping assembly in accordance with the invention installed on first and second components in a third relative position.

FIG. 3 shows a clamping assembly 1 for clamping a first component in the form of a bearing race 50 to a second component in the form of a shaft 34, which in use is clamped coaxially with the bearing race 50 with a clamping force in a first, axial direction X. The clamping assembly 1 comprises a first member in the form of a first ring 42 having a retaining formation in the form of a first annular inner thread 44 for retaining the first ring 42 to the corresponding threaded shaft 34 in a predetermined position with respect to the shaft 34. The clamping assembly 1 further comprises a second member in the form of a radially segmented second ring 46 and a third member in the form of a radially segmented third ring 48, each of which are locatable in use in a channel 66 of the first ring 42 between a contact surface 68 of the first ring 42 and the bearing race 50. An end face 90 of the first ring 42 is thereby spaced in use from the bearing race 50 by the segmented second 46 and third 48 rings to define an overall length Y of the clamping assembly 1 along the axial direction X. Each of the segments of the second and third rings 46, 48 are rotatable relative to adjacent segments of the respective ring 46, 48 about a circumference of the respective ring 46, 48. Opposing segments of the second 46 and third 48 rings are therefore free to roll relative to one another. The bearing race 50 includes a spacer ring 52 adjacent in use the segmented third ring 48. The spacer ring 52 includes a projection 92, which locates in use in a recess 94 of the channel 56 of the first ring 42. The projection helps locate the spacer 52 and therefore the segmented rings 46, 48 during assembly. The recess 94 has a length to accommodate relative movement between the assembly 1 and the spacer ring 52.

Figure 5:
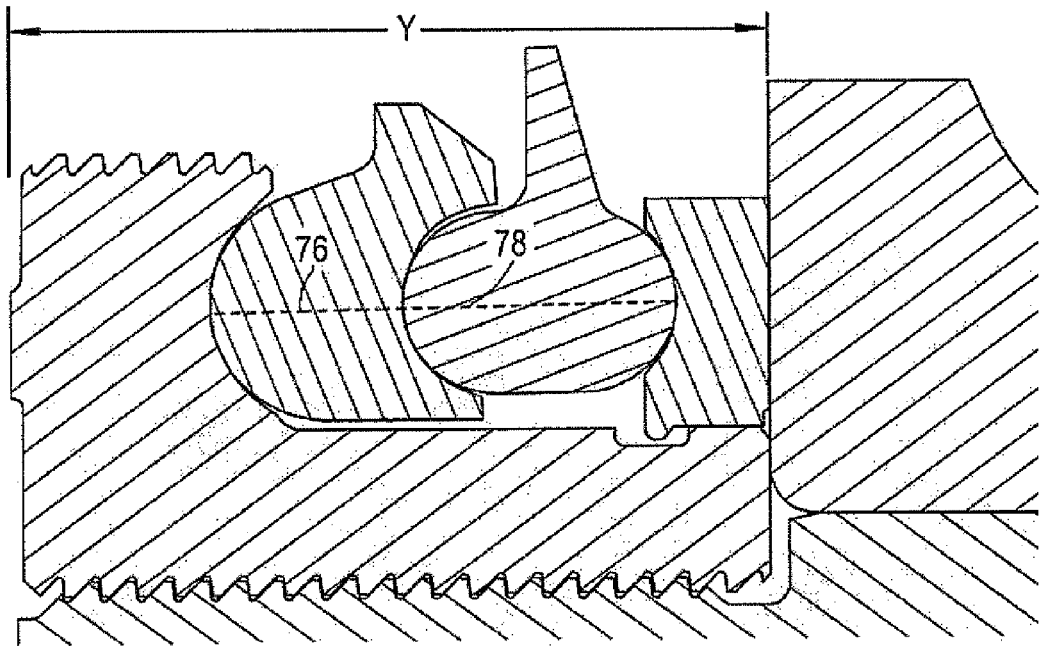
FIG. 5 is a sectional side view of part of the clamping assembly of FIG. 3 in a first relative position.

The second 46 and third 48 rings can be rolled relative to each other in use between first, second and third relative positions, and are shaped such that when the second 46 and third 48 rings are in the first relative position (as shown in FIG. 5), the clamping assembly is moved to a clamping position, in which the overall length Y of the clamping assembly 1 is such that the third segmented ring 48 is forced against the spacer 52 to thereby clamp the bearing race 50 and shaft 34 together, and stretch the shaft 34 in a direction Z. In the second relative position, (shown in FIG. 6), the clamping assembly is moved to a release position, in which the overall length of the Y of the clamping assembly 1 is reduced relative to the first position, such that the third segmented ring 48 is released from the spacer 52, such that the bearing race 50 and shaft are released from one another. In the third relative position (shown in FIG. 7), beyond the first relative position, the overall length Y is greater than in the second relative position, but less than in the first relative position, such that the bearing race 50 and the shaft 34 are clamped together, but to a lesser extent than in the first relative position. The second 46 and third 48 rings are shaped such that they are biased to the third relative position when they are located beyond the first relative position toward the third relative position, as described in further detail below.

Figure 4:
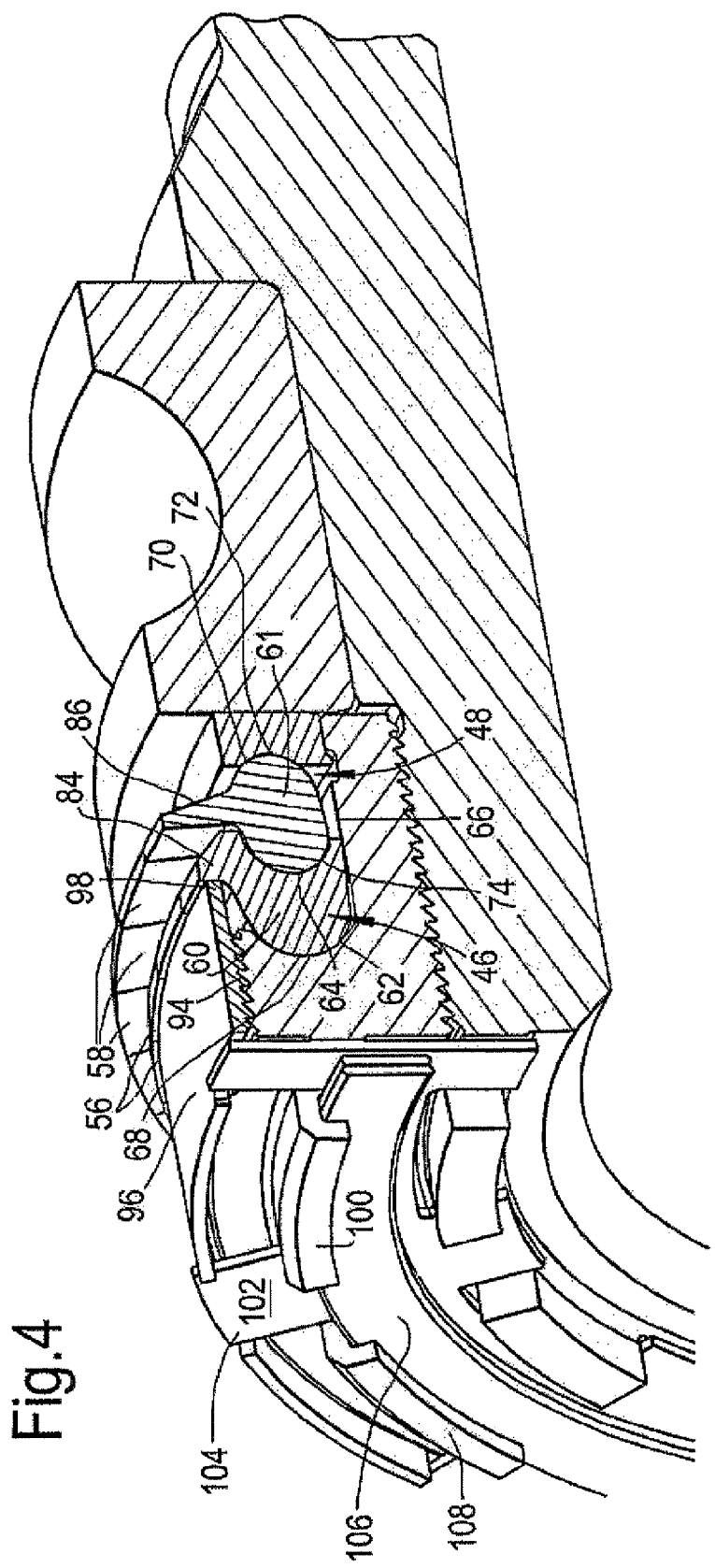
FIG. 4 is a close-up sectional perspective view of part of the clamping assembly of FIG. 3.

FIG. 4 shows a cross section through the assembly 1 in greater detail. Each of the second 46 and third 48 rings is formed from segments 56, 58 respectively. Adjacent segments of each of the rings 46, 48 are rotatable relative to each other across radial faces 60, 61 respectively. FIG. 4 shows the radial profile of segments 56, 58 of the first, 42, second 46 and third 48 rings and the bearing race 50.

Each segment 56 of the second ring 46 comprises a generally C shaped radial profile, having an outwardly convex first contact surface 62 which engages in use with the generally concave contact surface 68 of the first ring 42, and an inwardly concave second contact surface 64. Each segment 56 also includes an edge part 108 located at an annularly inner part of the respective segment 56.

Each segment 58 of the third ring 48 comprises a generally elliptical profile, having an outwardly convex first contact surface 70 engageable in use with a generally concave contact surface 72 of the spacer ring 52, and a second outwardly convex contact surface 74, which is engageable in use with the concave second contact surface 64 of the second ring 46.

The radius of curvature of the contact surface 68 of the first member 42 is larger than the radius of curvature of the first contact surface 62 of the second member 46, the radius of curvature of the second contact surface 64 of the second member 46 is larger than the second contact surface 78 of the third member 48, and the radius of curvature of the contact surface 72 of the spacer ring 52 is larger than the radius of curvature of the first contact surface 70 of the third member 48. This arrangement ensures that the second and third rings 46, 48 are able to roll relative to one another in use along their respective contact surfaces.

Each segment 56 of the second ring 46 includes a first lever 84 located on an annularly outer in use surface of the second ring 46, and each segment 58 of the third ring 48 includes a second lever 86 located on an annularly outer in use surface of the third ring 48.

Figure 6:
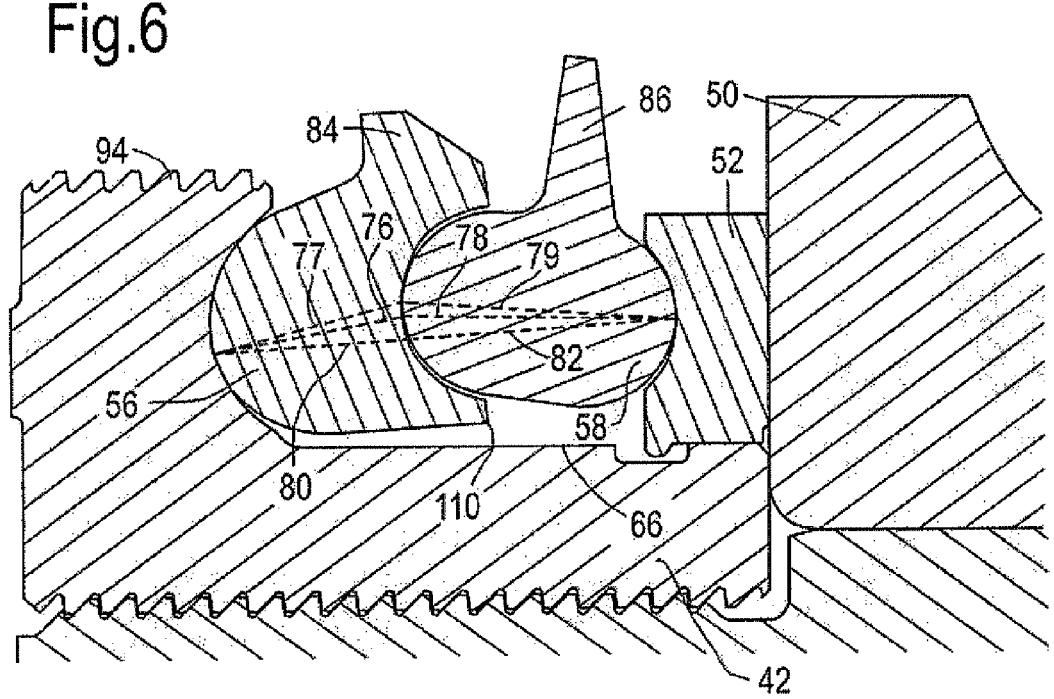
FIG. 6 is a sectional side view of the part of the clamping assembly of FIG. 3 in a second relative position.
Figure 7:
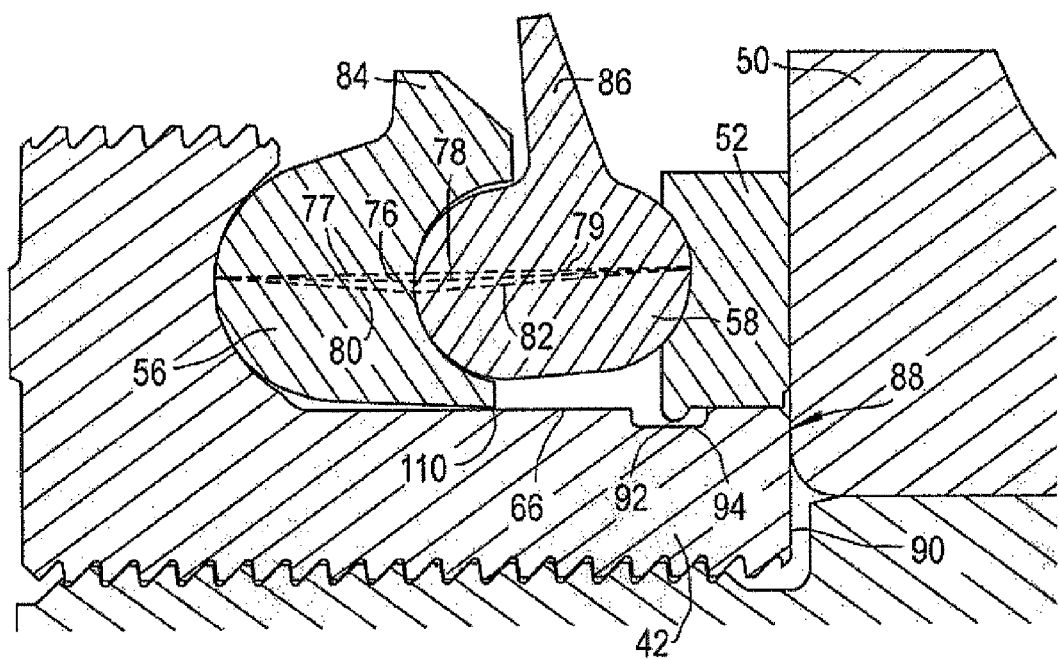
FIG. 7 is a sectional side view of the part of the clamping assembly of FIG. 3 in a third relative position

FIGS. 5, 6 and 7 show the profile shapes of ring segments 56, 58 in further detail with the second 46 and third 48 rings in the first, second and third relative positions respectively. Each of the ring segments 56, 58 has a long axis, 76, 78 respectively, an intermediate length axis 77, 79 respectively, and a short axis, 80, 82 respectively. When in the first relative position, the long axes 76, 78 of opposing second and third ring segments 56, 58 intersect, which thereby provides a maximum length Y of the assembly 1. When in the second position and in the third position, the long axes 76, 78 of opposing second and third ring segments are tangential to one another, such that the length of the assembly 1 along the axis X is reduced relative to the first position. In the third relative position, the intermediate length axes 76, 78 of opposing second and third ring segments 56, 58 intersect, and in the second relative position, the short axes 80, 82 intersect. When in the third position, the edge part 108 of each segment 56 engages against the surface of the channel 66 to prevent further movement of the second and third rings 46, 48 away from the first and third relative positions.

When the second and third rings 46, 48 are in the third relative position, shaft 34 is stretched such that a gap 88 is created between an end face 90 of the first member 42 and the bearing race 50.

Referring again to FIG. 4, the assembly 1 includes a locking arrangement. The locking arrangement includes a first locking ring 96 which comprises an engagement part 98, a locking formation 100 and a thread 95, which thread 95 is engageable with a second annularly outer thread 94 of the first ring 42. When installed, the engagement part 98 of the first tool 96 is engageable with the first lever 84 to prevent movement thereof away from the bearing race 50. The locking formation 100 is engageable with a second locking ring 102. The second locking ring 102 includes a plurality of bars 104 extending radially outwardly and inwardly of the circumference of the second locking ring 102, which bars 104 are locatable in use in recesses located between the locking formations 100 of the first locking ring 96. When installed, the second locking ring 102 is held in place by a retaining ring 106, which overlies the second locking ring 102, and is in turn held in place by hooks 108 provided on a front part of the first ring 42.

Figure 8:
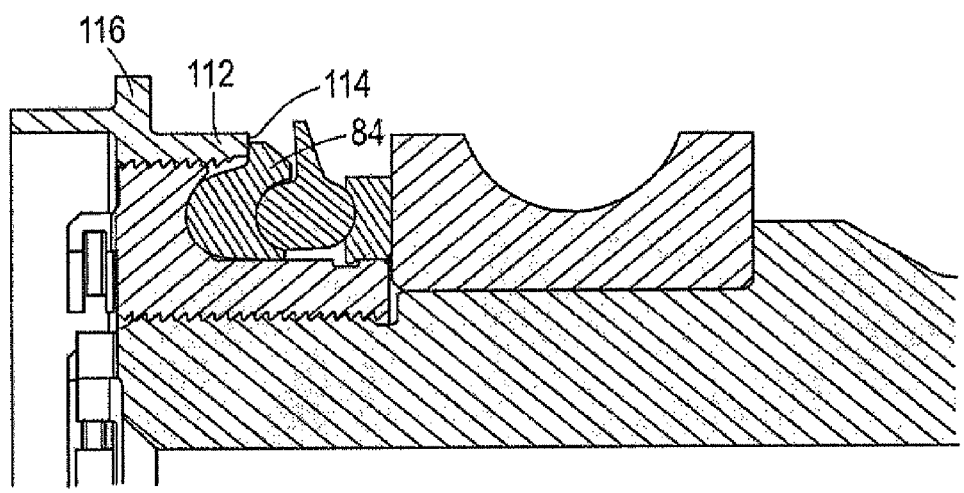
FIG. 8 is a sectional side view of the part of a clamping assembly during a clamping step utilising a first tool.
Figure 9:
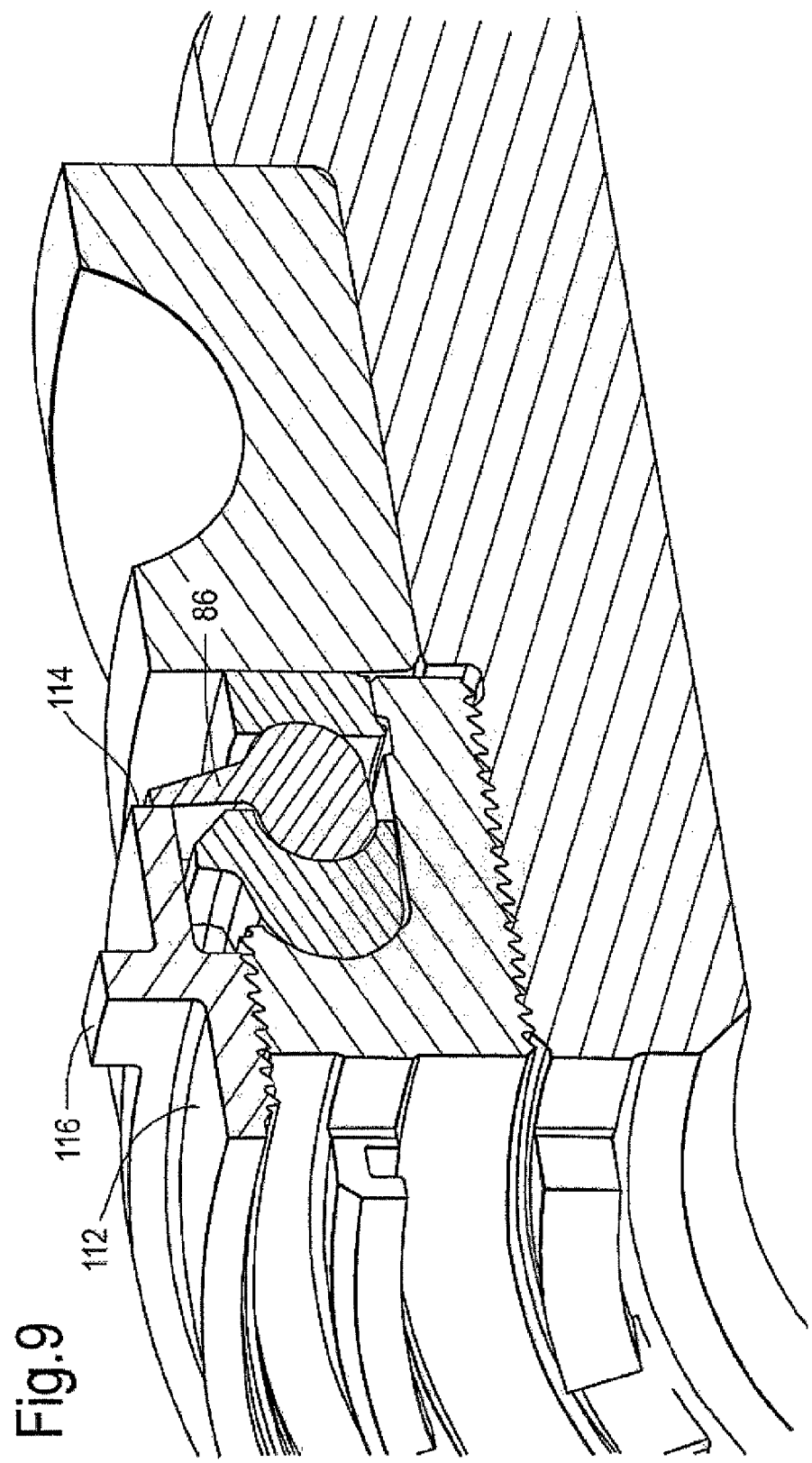
FIG. 9 is a sectional perspective view of the clamping assembly of FIG. 8 during a releasing step utilising a second tool.

Referring to FIGS. 8 and 9, the assembly 1 further includes first and second tools 112, 120. The first tool 112 comprises a thread 113, which is engageable with the second thread 94 of the first ring 42. The first tool 112 also comprises an engagement part 114 which is engageable with the first lever 84 to move the second and third rings 46, 48 from the second relative position to the first relative position, and from the first relative position to the third relative position. The first tool 112 also includes an annularly outwardly projecting projection 116, which can be manipulated to rotate the first tool 112 about the axis of the shaft, thereby moving the tool 112 either away from or toward the first lever 84 along the thread.

FIG. 9 shows the second tool 122. The second tool 122 is similar to the first tool 112, and includes a thread 123 engageable with the second thread 94 of the first ring 42, an engagement part 124 and an annularly outwardly projecting projection 126. The engagement part 124 is configured to engage with the second lever 86, and thereby to move the second and third rings 46, 48 from the third relative position to the first relative position, and from the first relative position to the second relative position.

The assembly 1 can be used to clamp a first component such as the bearing race 50 to a second component such as a shaft 34 as follows.

The second 46 and third 48 rings and the spacer 52 are located in the channel 66 of the first ring 42 in the second relative position, as shown in FIG. 5. The first member 42 is then rotated relative to the shaft 34 until the end 90 of the first member 42 contacts the spacer 50.

The first tool 112 is then threaded to the second thread 94 of the first ring 42, and rotated in a clockwise direction (with a right-hand thread, or anti-clockwise with a left-hand thread) as viewed from the end of the shaft shown in FIG. 3, to thereby move the first lever 84 toward the bearing race 50 (i.e. to the right for the upper segment shown in FIG. 5). Movement of the first lever 84 causes the second ring 46 to roll against the contact surface 68 of the first ring 42. Frictional forces between the second contact surfaces 64, 74 of the second 46 and third 48 rings causes the rings 46, 48 to roll relative to each other across the respective contact surface of the other of the second and third rings 46, 48, The third ring 48 is thereby caused to roll across the contact surface 72 of the spacer 52, and thus the second and third rings 46, 48 are caused to move from the second relative position to the first relative position and thereby clamp the bearing race 50 and shaft 34 theretogether. Further clockwise rotation of the first tool 112 causes further movement of the first lever 84 towards to the bearing race 50, and causes the second and third rings 46, 48 to move to the third relative position. Once in the third relative position, further movement of the second and third rings 46, 48 is prevented by contact between the edge part 108 of each segment 56 of the second ring 46, and the channel 66.

Once the second and third rings 46, 48 are in the third relative position, the tool 112 is removed by anti-clockwise rotation, and the locking arrangement is installed. The locking arrangement is installed by threading the first locking ring 96 onto the second thread 94 of the first ring 42 until the engagement part 98 engages with the first lever 84. The second locking ring 102 is then placed against the end of the first ring 42, with the bars 104 located in the recesses defined by the locking formations 100. The retaining ring 106 is then located over the second locking ring 102 to retain the second locking ring, and therefore the first locking ring 96, in place. Assembly 1 is thereby locked in the clamped position, with the second and third rings 46, 48 in the third relative position. This arrangement provides redundant locking of the assembly, such that the assembly cannot be accidentally moved to the unclamped position.

It has been found that (for the particular geometry shown) the maximum torque which must be applied to the tool 112 to move the assembly 1 to the clamped position is approximately 1/12 that required in prior arrangements such as that shown in FIG. 1. Relative reductions in required torque of between 10 and 20 can be achieved.

To release the bearing race 50 from the shaft 34, the locking arrangement is removed by reversal of the above installation steps. The second tool 122 is then threaded on to the second thread 94 of the first ring 42, and rotated clockwise (in the case of a right-hand thread, or anticlockwise in the case of a left-hand thread) to engage with the second lever 86, and thereby move the second lever toward the bearing race 50. This thereby moves the second and third rings 46, 48 from the third position to the first position, and then the second position in a similar manner to the installation step.

Figure 10:
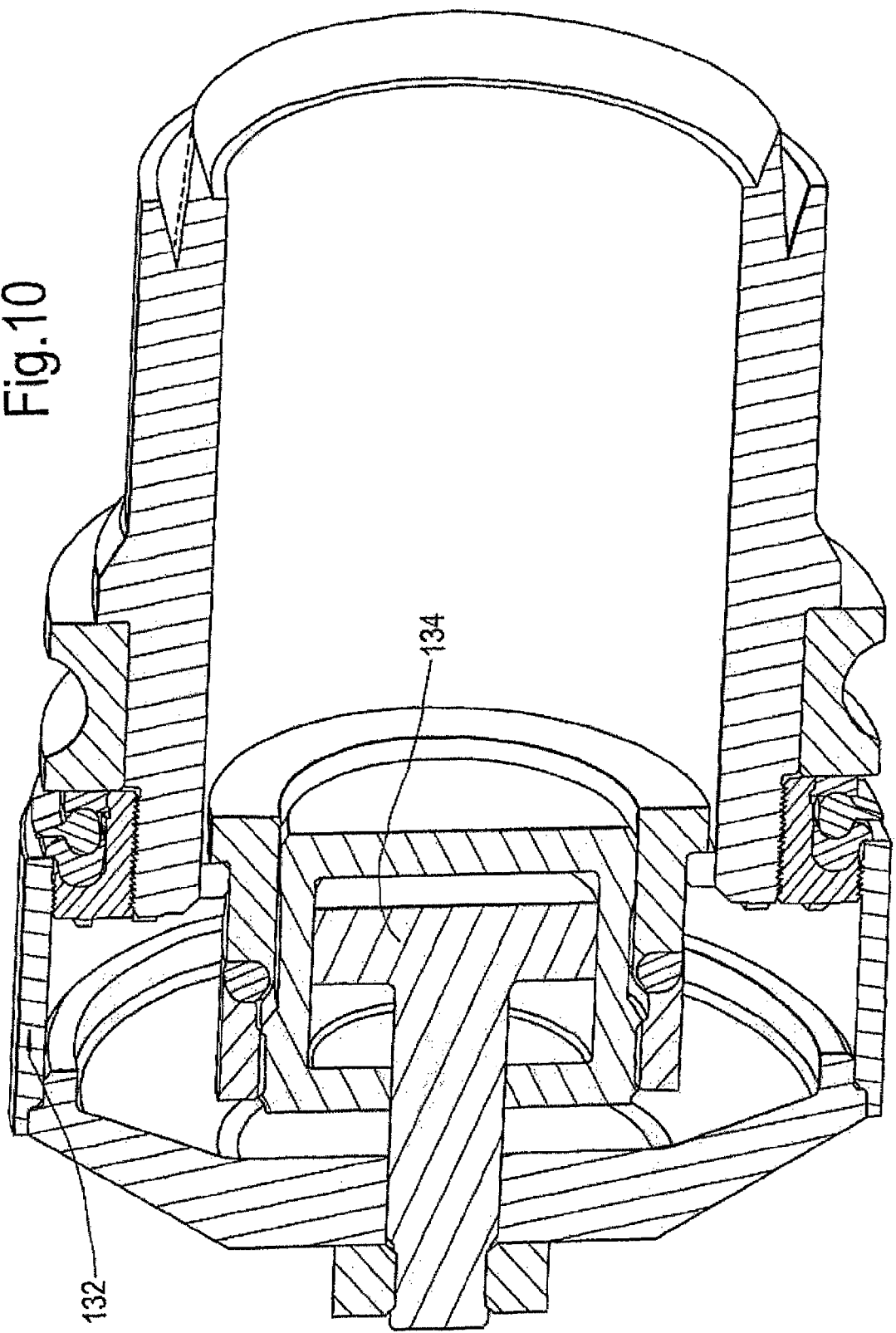
FIG. 10 is a sectional side view of the part of a clamping assembly during a clamping step utilising an alternative tool.

FIG. 10 shows an alternative first tool 132 for moving the assembly from the clamped position (i.e. the first or third relative positions) to the unclamped position (i.e. the second relative position), or vice versa. The tool 132 includes an engagement part 134 which is engageable with the first lever 84 to move the second and third rings 46, 48 from the second relative position to the first relative position, and from the first relative position to the third relative position in a similar way to the first tool 112. However, the first tool 132 is urged toward the bearing race 50 by a hydraulic ram 134 which acts in an axial direction. This arrangement does not therefore require a torque to be imparted on the shaft 34 to clamp the bearing race 50 to the shaft 34, and therefore negates the requirement for torque reaction features on the shaft, which would otherwise add weight to the design. A similar second tool (not shown) could be provided, which would engage against the second lever 86 to move the assembly 1 to the unclamped position.

Before the assembly 1 is installed on the first and second components, the assembly is preferably calibrated, such that when installed, the assembly imparts a predetermined clamping force to the components to be clamped.

Figure 11:
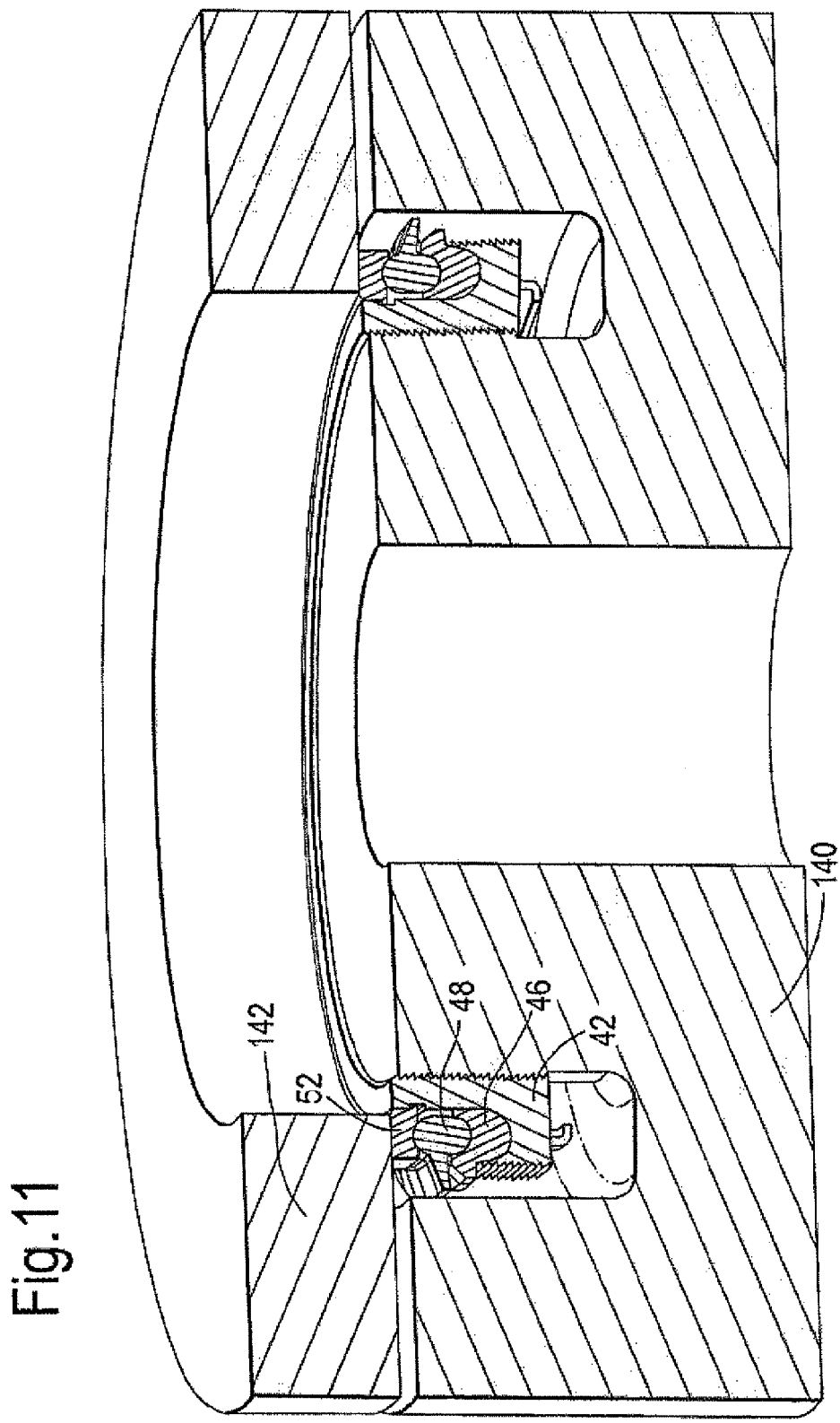
FIG. 11 is a sectional perspective view of the clamping assembly of FIGS. 1 to 9 showing a calibration method in accordance with the present invention.

FIG. 11 shows a preferred calibration method. The first second and third rings 42, 46, 48 and the spacer 52 are installed in a fixture 140, with the second and third rings 46, 48 in the third relative position. A predetermined axial load is then applied to the spacer 52 by means such as an hydraulic ram 142. The predetermined load is the load required to clamp the first and second components in use. The first, second and third rings 42, 46, 48 are compressed slightly in the axial direction (i.e. the length Y is reduced) to the same extent as they would be when installed and in the clamped position.

A thickness of material is then removed from the end 90 of the first ring 42. The necessary thickness of material to be removed from the end 90 is determined by how much stress calculations show that the shaft must be stretched by in order to achieve the desired end load on the clamped component. Typically the amount will be in the region of 0.010 inches for a lamp load of 40,000 lbf on a shaft of approximately 4 inches diameter. By utilising this method, manufacturing tolerances in the assembly are substantially eliminated.

Figure 12:
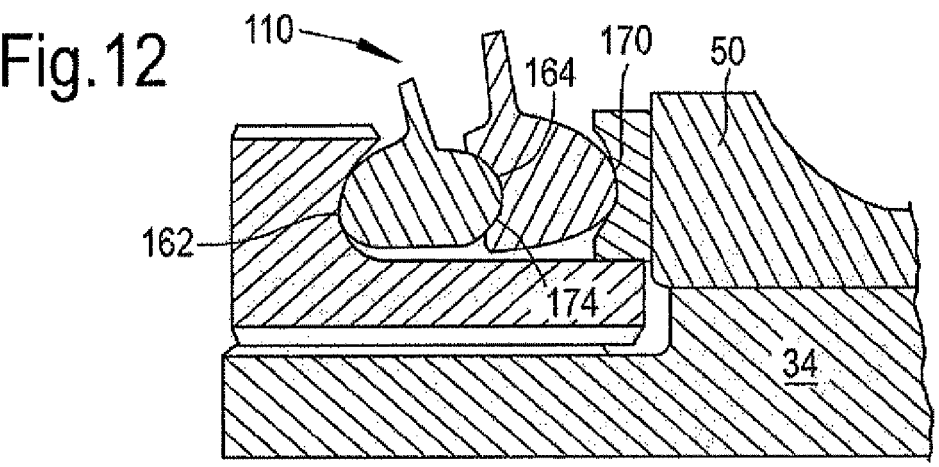
FIG. 12 is a sectional side view of part through part of a second clamping assembly in accordance with the invention in a first relative position.

FIG. 12 shows a second embodiment of the invention, comprising a clamping assembly 110 installed on a shaft 34 and a bearing race 50. In this embodiment, the assembly 110 includes second and third members comprising second and third segmented rings 146, 148. The second ring 146 comprises convex first and second contact surfaces 162, 164, and the second ring comprises a convex first contact surface 170 and concave second contact surface 174. The second clamping assembly is otherwise similar to the first embodiment.

Figure 13:
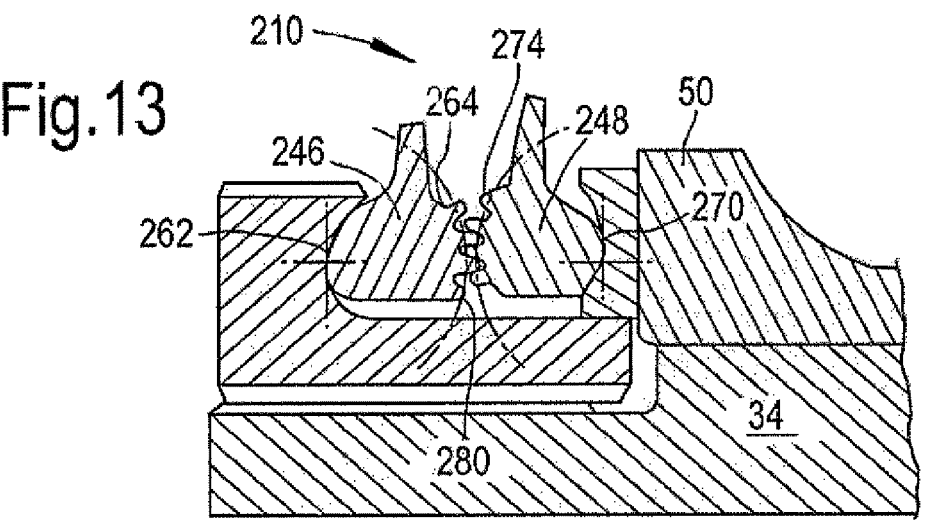
FIG. 13 is a sectional side view of part through part of a third clamping assembly in accordance with the invention in a first relative position.

FIG. 13 shows a third embodiment of the invention comprising a clamping assembly 210 installed on a shaft 34 and a bearing race 50. Again, the assembly includes second and third members in the form of second and third rings 246, 248. The first contact surfaces 262, 270 are similar to those of the first and second embodiments. However, the second contact surfaces 264, 274 of the second and third members are defined by teeth 280 having a convex pitch surface, and which engage in use with the teeth 280 of the other respective second contact surface 264, 274. The teeth enable a higher torque to be applied by the assembly 210 without the second and third rings 246, 248 slipping relative to each other when moved between the first, second and third relative positions.

Figure 14:
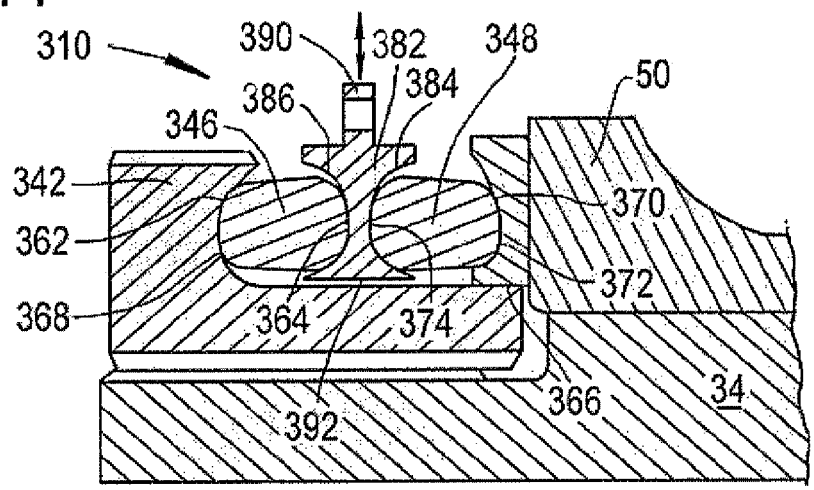
FIG. 14 is a sectional side view of part through part of a fourth clamping assembly in accordance with the invention in a first relative position.

FIG. 14 shows a fourth embodiment of the invention comprising a clamping assembly 310 installed on a shaft 34 and a bearing race 50. The assembly 310 includes first, second, third and fourth members comprising first, second, third and fourth rings 342, 346, 348 and 382 respectively. The second ring 346 includes a first convex contact surface 362 which in use is engageable with a concave contact surface 368 of the first ring 342, and the third ring 346 includes a first convex contact surface 370, which in use is engageable with a concave contact surface 372 of the bearing race 50. The second and third rings 346, 348 include respective second convex contact surfaces 364, 374. The fourth ring 382 is disposed in use between the second and third rings 346, 348, and defines a pair of generally concave contact surfaces 384, 386, which are engageable in use with a respective convex second contact surface 364, 374 of the second and third rings 346, 348.

The fourth ring includes a tool engaging formation in the form of an annularly outer projection 390 and an annularly inner edge part 392. The assembly 310 is moveable between first, second and third relative positions, similar to the relative positions in the first, second and third embodiments. In the third relative position, the annularly inner edge part 392 engages against a channel 366 of the first ring 342, and the bearing race 50 is clamped against the shaft 34. To move the assembly 310 from the third relative position to the second (as shown in FIG. 14) and first relative positions, the projection 392 is pulled annularly outwardly (i.e. upwardly for the segment shown in FIG. 14). Similarly, the assembly 310 is moved from the first relative position to the second and third relative positions by pushing the projection 392 annularly inwardly (i.e. downwardly for the segment shown in FIG. 14).

FIGS. 15 to 18 show a fifth clamping apparatus 410 installed on a shaft 34 and a bearing race 50. The fifth clamping apparatus 410 is similar to the first clamping apparatus 10, but includes segmented first, second and third rings 442, 446, 448 and a spacer ring 452 having different shapes relative to the rings 42, 46, 48, 52 of the first apparatus 10.

Figure 15:
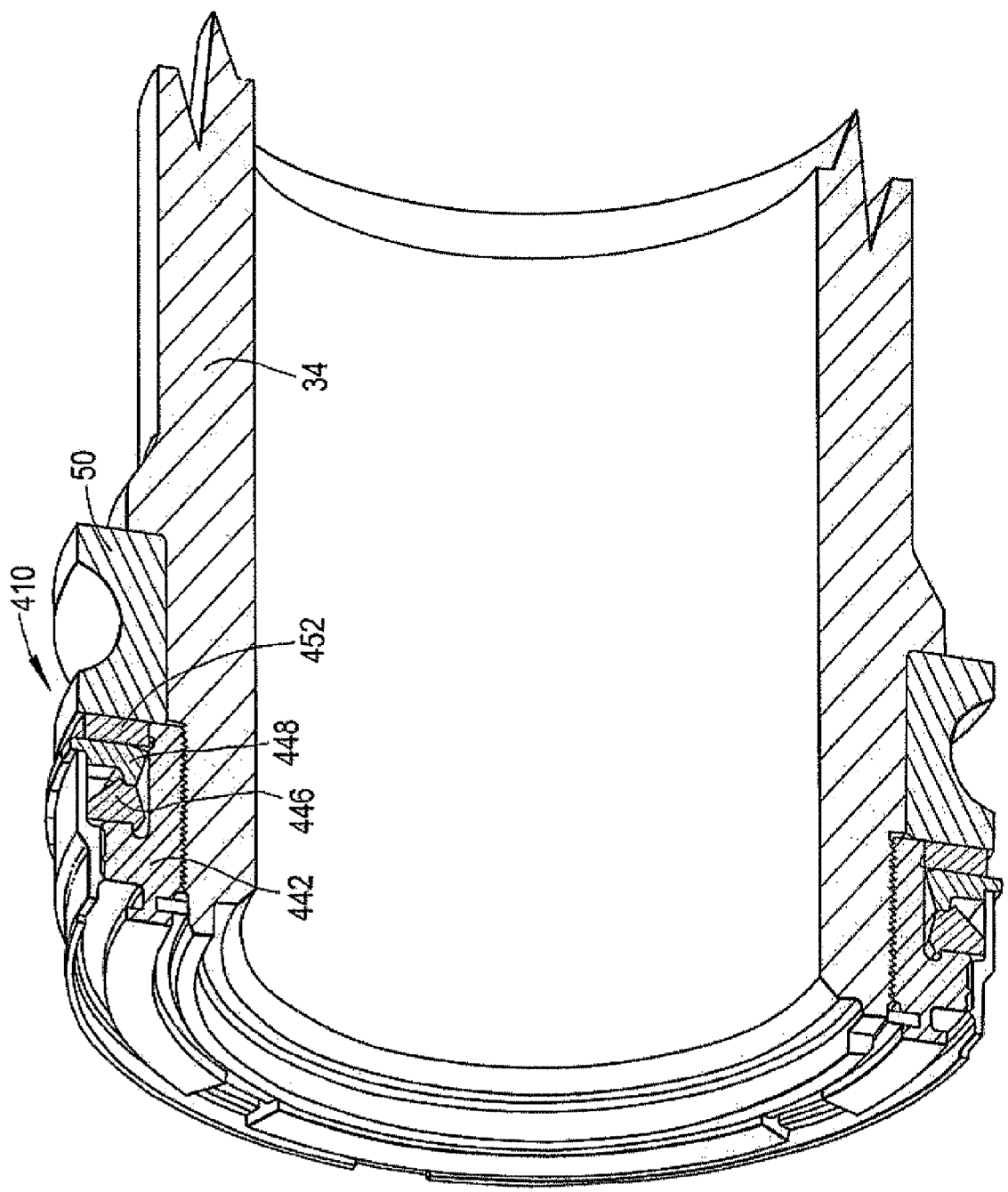
FIG. 15 is a similar view to FIG. 3, but of a fifth clamping assembly in accordance with the invention.
Figure 16:
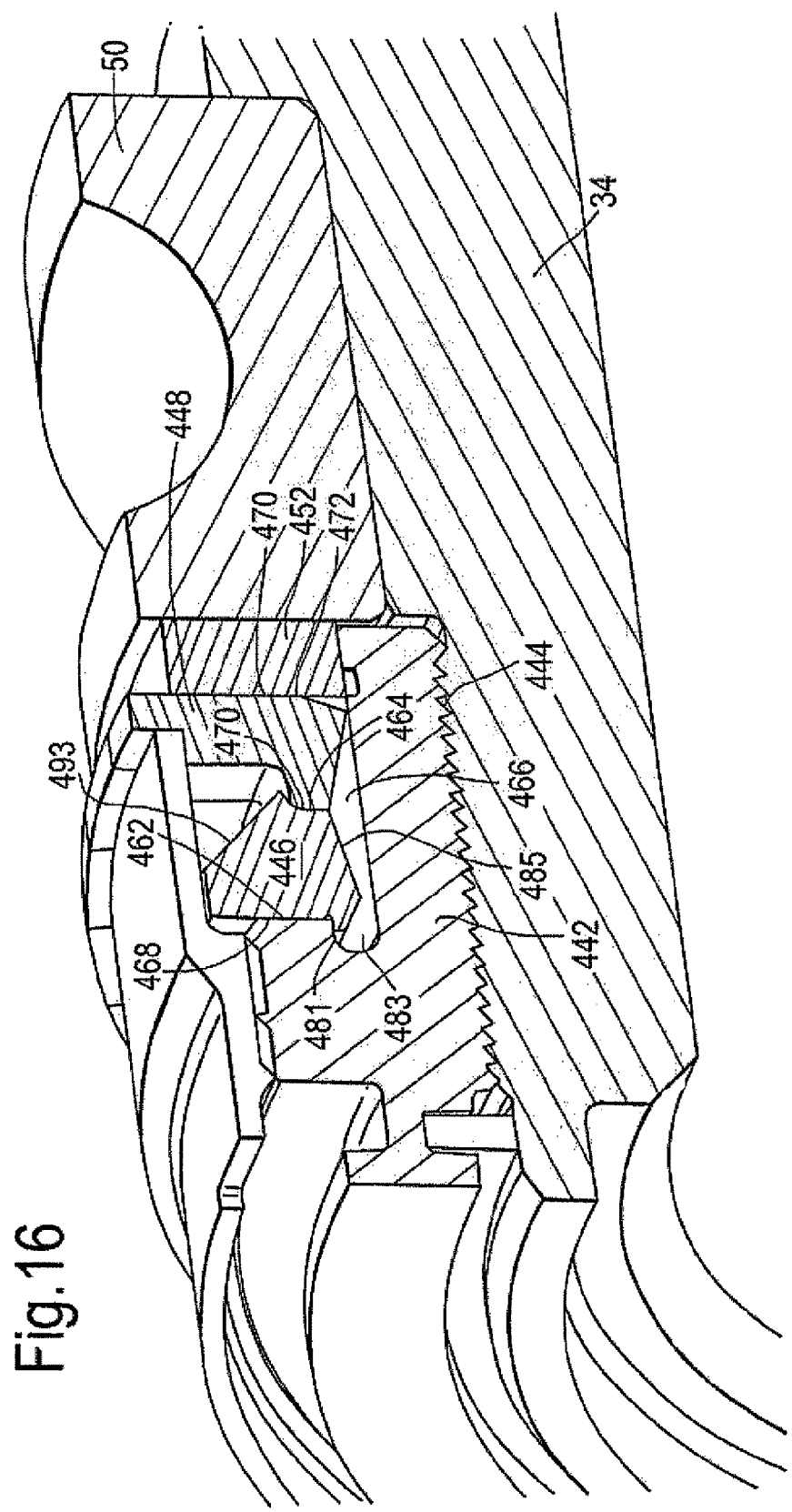
FIG. 16 is a close-up sectional perspective view of part of the clamping assembly of 15 in a first position.
Figure 17:
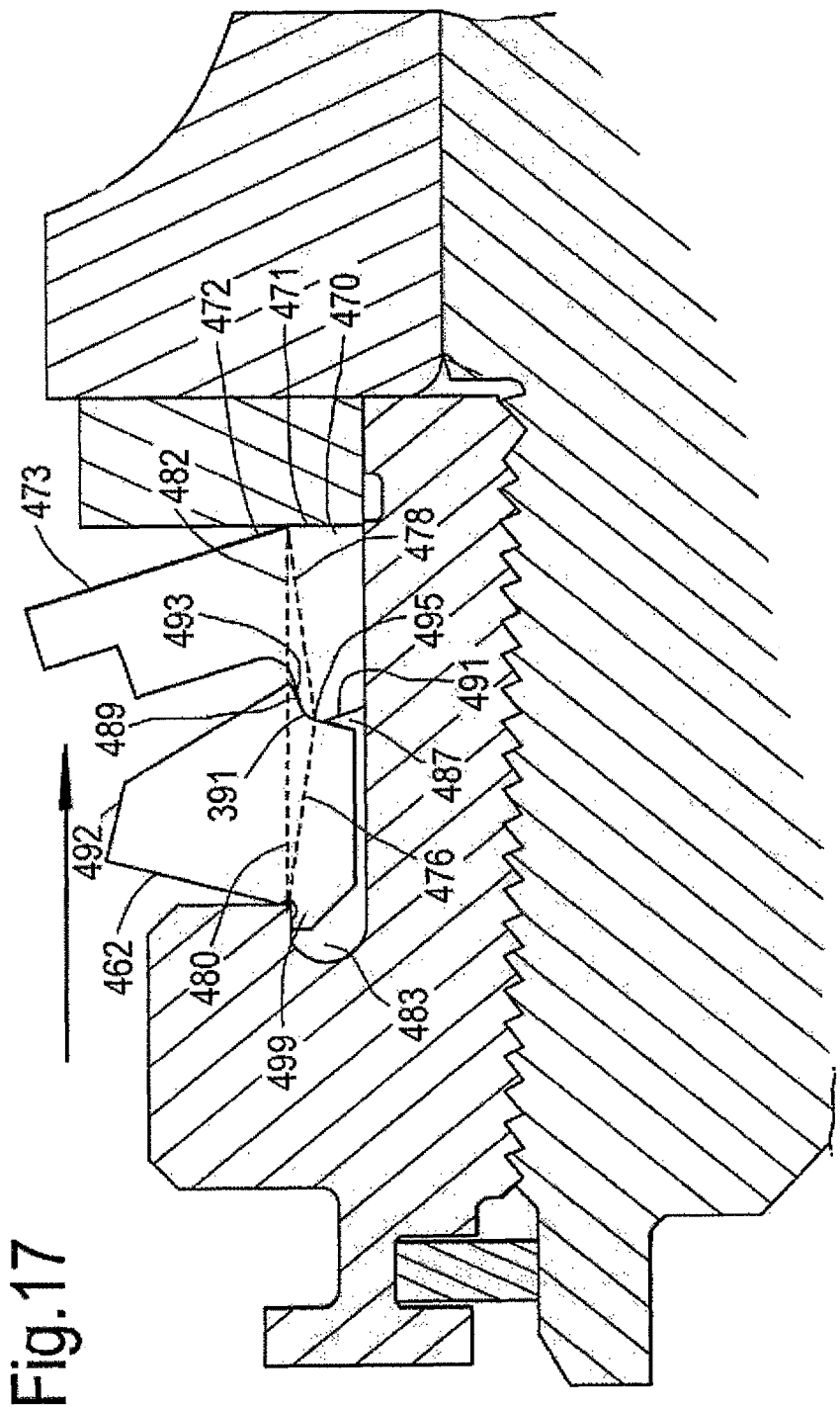
FIG. 17 is a sectional side view of the clamping assembly of FIG. 15 in a third position.
Figure 18:
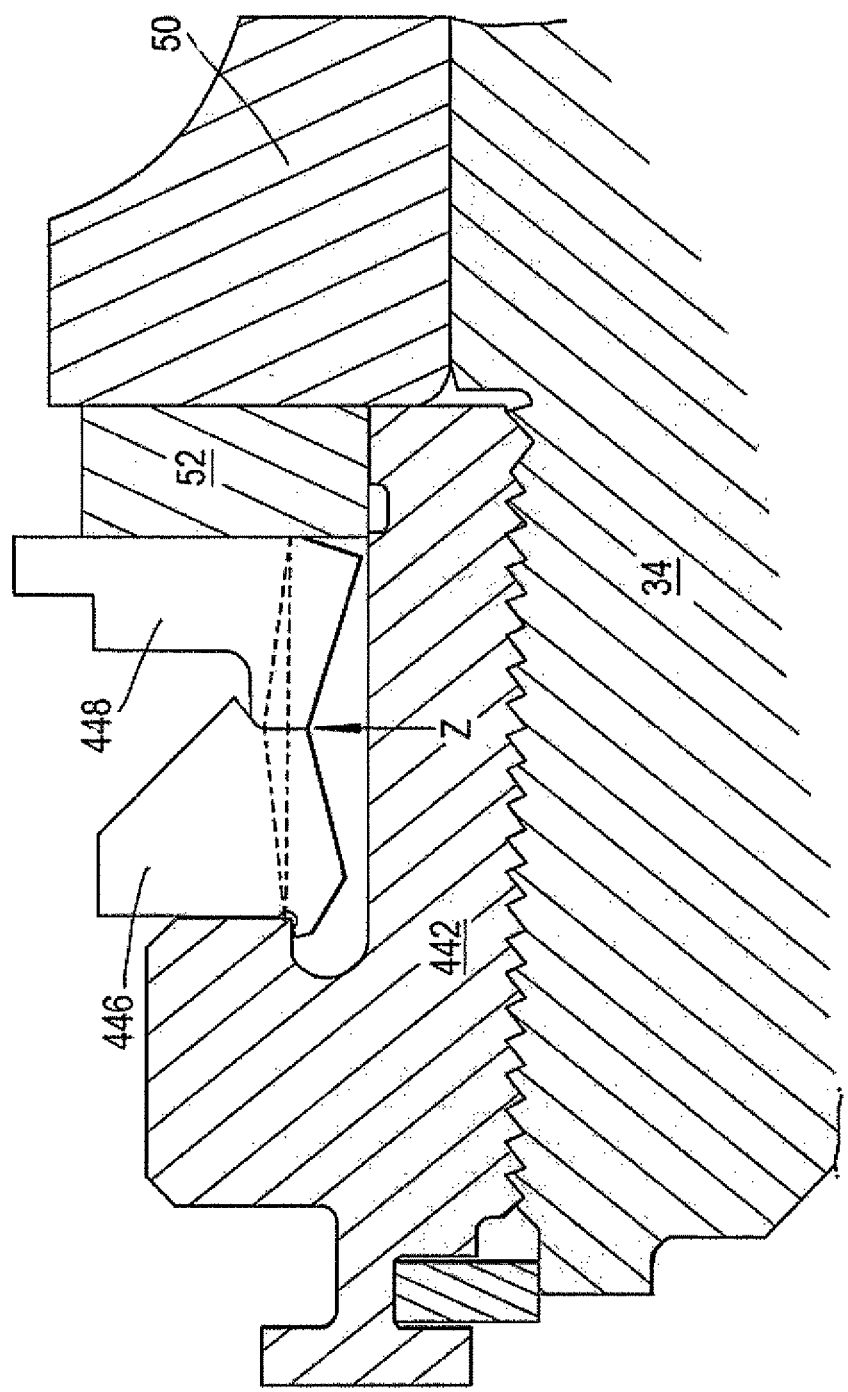
FIG. 18 is a sectional side view of the clamping assembly of FIG. 15 in a first position.

FIGS. 15, 16 and 18 show the fifth clamping apparatus 410 in a first, clamped position, while FIG. 17 shows the fifth clamping apparatus 410 in a third, unclamped position. The apparatus 410 is also positionable to a second, unclamped position intermediate the first and third positions, similar to the apparatus 10. The first, second and third rings 442, 446, 448 are shown in more detail in the third position in FIG. 16.

The first ring 442 comprises a first retaining formation in the form of a first annular thread 444 for retaining the ring 442 to the corresponding threaded shaft 34 in a predetermined position with respect to the shaft 34. The annular thread 444 is similar to the thread 44 of the first clamping apparatus 10, and so the fifth clamping apparatus 410 is interchangeable with the first clamping apparatus 10.

The first ring 442 comprises a channel 466 in which the second and third rings 446, 448 are locatable. The first ring 442 includes a lip 481 which extends part way across the channel 466, and defines a part circular profile recess 483 which extends between the lip 481 and the radially inner surface of the channel 466. The lip 481 comprises a contact surface 468 which faces the channel 466. The contact surface 468 is generally planar and extends generally perpendicularly to the plane of the channel 466.

The second ring 446 comprises a first generally planar contact surface 462 which is angled such that the first contact surface 462 of the second ring 446 lies flat against the contact surface 468 of the first ring 442 when in the third position, as shown in FIGS. 15 and 16. The second ring 446 further comprises a radially inner surface 485. The radially inner surface 485 is generally planar, and extends at an acute angle from the first contact surface 462. The second ring 446 further comprises a second contact surface 464 which extends from the inner surface 385 in a generally radial direction. The second contact surface 464 is concave (as shown in FIGS. 19 and 20 in particular) and comprises first 487 and second 489 planar portions which are angled relative to each other and joined by a curved third portion 491. A radially outer surface 493 joins the second portion 489 of the second contact surface 464 to the first contact surface 462. The second ring further comprises a projection 499 which extends from a radially inner end of the first contact surface 462 and engages with a radially inner facing edge of the lip 481. The lip 481 and projection 499 therefore maintain the second ring 446 within the channel 466 in use and provide a pivot, particularly when the second ring 442 is force upwardly by the third ring 448 when the apparatus 410 is moved from the first to the third position.

The third ring 448 comprises a first planar contact surface 470 which engages with a planar contact surface 472 of the spacer ring 452. The contact surface 470 comprises first and second portions 471, 473. Each of the first and second portions 471, 473 of the first contact surface 470 is generally planar, and is angled relative to the other defining an obtuse internal angle. The first portion 471 and contact surface 472 of the spacer ring 452 lie flat against each other when in the third position, as shown in FIG. 17, and the second portion 473 and contact surface 472 lie flat against each other when in the third position as shown in FIGS. 15, 16 and 18. The first and second portions 471, 473 therefore serve as stops to prevent the clamping apparatus 410 from moving beyond the first and third positions. The second portion 473 has a greater length, and therefore a greater contact area relative to the first portion 471. This is desirable since the second portion 473 will experience a greater load in use relative to the first portion 471. This arrangement therefore provides a relatively large contact area compared to the clamping apparatus 10, thereby spreading the clamping load over a larger area and reducing the risk of damage to the apparatus 410 in use.

The third ring 448 further comprises a second contact surface 478. The second contact surface 478 is configured to engage with the second contact surface 464 of the second ring 446. The second contact surface 478 is generally convex, and comprises first 491 and second 493 planar portions which are angled relative to each other and joined by a curved third portion 495. Generally, the internal angles of the second contact surfaces 464, 478 add up to less than 360°, so that a gap is provided between part of the contact surfaces 464, 478, as shown in FIG. 19. Consequently, the second and third rings 446, 448 are able to roll relative to one another between the first, second and third positions.

The apparatus 410 is operated in a similar manner to the apparatus 10, and an optional locking ring 496 can be provided to maintain the apparatus 10 in the third position. The second and third rings 442, 446 define long axes 476, 478 and short axes 480, 482 respectively. Similarly to the first apparatus 10, when in the first relative position, the long axes 476, 478 of second and third rings 442, 446 intersect, which thereby provides a maximum length, and when in the third relative position, the short axes 480, 482 of second and third rings 442, 446 intersect, which thereby provides a minimum length of the apparatus 410. The apparatus 410 has a number of improvements over the apparatus 10. For example, when installed on a spinning object such as a shaft 34, centrifugal force in use acts in a radially outer direction Z, thereby biasing the apparatus 410 to the clamped position. Furthermore, the shapes of the rings 446, 448, 452 ensure that the contact surfaces 462, 464, 468, 470, 472 and 478 are flat, and so provide a large contact area when in the first, clamped position.

The present invention therefore provides a clamping assembly having a number of advantages of prior arrangements.

The variation in clamping loads has been found to be reduced to around ±10%, from around ±50% in prior arrangements. The torque or axial forces required to move the clamping assembly from the unclamped position to the clamped position can be around 1/10 to 1/20 of the required clamping torque. This is substantially lower than previous arrangements.

Damage to the clamped components such as galling is substantially eliminated. The locking arrangement provides both secondary and tertiary redundant locking, thereby providing a safer, more secure clamping assembly. The assembly presents a relatively low annular profile, and is therefore suitable for use in confined spaces. This may enable components to be assembled/disassembled without the need for disassembling further components.

The clamping force is less prone to variations caused by thermal differentials. This is because the segmented rings 46, 48 and spacer 52 thermally expand in an axial direction, compensating somewhat for the axial expansion of the shaft 34 and first member 42 away from the clamped component 50. The assembly 1 can be installed on existing components, as no modifications to the clamped components are required.

The assembly is relatively easy to use, requiring no specialist training.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, while separate first and second tools are described, a single tool could be used, having first and second ends or sides for engaging with a respective first or second lever.

The assembly could be used to clamp any suitable components together. For example, the assembly could be used to clamp a bearing outer race into a shaft housing.

The third member could directly contact the first component, instead of contacting the spacer member. This would be appropriate for instance where high accuracy of the final clamping load is not required.

The invention is most suitable for relatively large diameter shafts, particularly as the required applied torque used in prior arrangements can be relatively high. However, the invention is suitable for substantially any sized components.

While the exemplary embodiments of the invention have described the invention in use on a shaft in a gas turbine engine, other applications are applications are envisaged. For example, the invention could be used to clamp components, and particularly shafts and bearing races, in propeller shafts in ships, generators, wind turbines, aircraft, machine tools are among many potential applications (apart from the gas turbine application described herein).

The invention claimed is:

1. A clamping assembly for clamping a first component to a second component, the clamping assembly comprising:
   a first member spaced from the first component in use along a first axis by a second and a third member, and
   a retaining formation for retaining the first member in a predetermined position relative to the second component;
   wherein at least one of the first member, second member, third member and the first component is shaped such that when the second and third members are in a first relative position, the overall length of the clamping assembly is at a maximum along the first axis such that the third member is forced against the first component to thereby clamp the first and second components together; and
   wherein the second and third members are arranged to roll or pivot relative to one another to a second relative position such that the overall length of the clamping assembly is reduced relative to the first relative position and the clamping assembly is moved to a release position.

2. A clamping assembly according to claim 1, in which at least one of the first, second and third members is shaped such that when the second and third members are located between the first and third relative positions, the second and third members are biased toward the third relative position.

3. A clamping assembly according to claim 1, in which the second and third members are locatable in use in a channel of the first member, and an edge part of at least one of the second and third members engages with an engagement surface of the channel when the second and third members are in the third relative position to retain the second and third members in the third relative position.

4. A clamping assembly according to claim 1, in which the second member includes a first contact surface which in use is engageable with a contact surface of the first member, the third member includes a first contact surface, which in use is engageable with a contact surface of the first component, the second member includes a second contact surface, which in use is engageable with a second contact surface of the third member, wherein one or both of the first and second contact surfaces of the second and third members comprises an inwardly or outwardly curved surface.

5. A clamping assembly according to claim 4, in which one of the second and third members defines a long axis and a short axis, each extending between first and second contact surfaces of the respective second or third member, and is arranged such that the long axis intersects with the second contact surface of the other of the second and third member when in the first relative position, and the long axis is tangential to the second contact surface of the other of the second and third member when in either of the second or third relative positions.

6. A clamping assembly according to claim 4, in which the contact surface of either or both of the first member and the first component comprises a generally concave profile.

7. A clamping assembly according to any of claim 4, in which the first contact surface of the second member comprises a generally convex profile, and the second contact surface of the second member comprises a generally concave profile, and both of the first and second contact surfaces of the third member may comprise a generally convex profile.

8. A clamping assembly according to claim 7, in which the radius of curvature of the contact surface of the first member is substantially equal to or greater than the radius of curvature of the first contact surface of the second member, the radius of curvature of the second contact surface of the second member is substantially equal to or greater than the radius of curvature of the second contact surface of the third member, and the radius of curvature of the contact surface of the first component is substantially equal to or greater than the radius of curvature of the first contact surface of the third member.

9. A clamping assembly according to claim 1, in which the second member includes a first contact surface which in use is engageable with a contact surface of the first member, the third member includes a first contact surface, which in use is engageable with a contact surface of the first component, the second member includes a second contact surface, which in use is engageable with a second contact surface of the third member, wherein the second contact surfaces of the second and third members are defined by teeth having a convex pitch surface, which teeth engage in use with the teeth of the other respective second contact surface.

10. A clamping assembly according to claim 1, in which the second member includes a first contact surface which in use is engageable with a contact surface of the first member, the third member includes a first contact surface, which in use is engageable with a contact surface of the first component, the second and third members include respective second contact surfaces, wherein the assembly includes a fourth member disposed in use between the second and third members, the fourth member defining a pair of generally concave contact surfaces, which are engageable in use with a respective convex second contact surface of the second and third member.

11. A clamping assembly according to claim 1, in which the second member comprises a first lever extending from a surface of the second member configured to move the assembly from the first relative position to at least the second relative position, and possibly to the third relative position, and the third member comprises a second lever extending from a surface of the third member configured to move the assembly from the first relative position and possibly from the third relative position to the second relative position.

12. A clamping assembly according to claim 1, in which the first component includes a spacer member which defines the contact surface of the first component.

13. A clamping assembly according to claim 1, in which one or more of the first, second, third or fourth members comprises a ring, and in which respective second or third members comprise one of a flexible ring or a radially segmented ring, wherein the segments are configured to be rotatable relative to each other about a circumference of the ring.

14. A clamping assembly according to claim 1, in which the second component comprises a shaft, and the first component, and first, second and third members are coaxial with the shaft.

15. A clamping assembly according to claim 14, further comprising a locking arrangement configured to engage against an end surface of the first member when the assembly is in either the first or third relative position to lock the second and third members in the third relative position.

16. A clamping assembly according to claim 1, in which the first member may defined a second thread formation and may be engageable with one or more tools such that relative rotation between the tool and the first member axially translates an end of the tool by the second thread formation, to engage with one of the first and second levers.

17. A gas turbine engine comprising a first component and a second component, the first and second components being clamped by a clamping assembly according to claim 1.

18. A method of calibrating a clamping assembly according to claim 1 such that, when installed with the second and third members in a third position, the assembly imparts a predetermined clamping force to the clamped components, the method comprising the steps of:
- retaining the first member in a predetermined position relative to a fixture;
- assembling the second and third members in the third relative position;
- applying a predetermined axial load to the third member; and
- removing a predetermined thickness of material from a proximal to the first component in use face of the first member.

* * * * *